United States Patent
Lechtenberg et al.

(10) Patent No.: US 8,831,901 B2
(45) Date of Patent: Sep. 9, 2014

(54) METHODS SYSTEMS AND APPARATUS FOR RANKING TESTS USED TO IDENTIFY FAULTS IN A SYSTEM

(75) Inventors: Kelly Jean Lechtenberg, Albuquerque, NM (US); Qingqiu Ginger Shao, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 457 days.

(21) Appl. No.: 13/161,262

(22) Filed: Jun. 15, 2011

(65) Prior Publication Data

US 2012/0323518 A1 Dec. 20, 2012

(51) Int. Cl.
*G01F 19/00* (2006.01)

(52) U.S. Cl.
USPC .......................................................... 702/108

(58) Field of Classification Search
CPC ..................................................... G01F 19/00
USPC .......................................................... 702/108
See application file for complete search history.

(56) References Cited

U.S. PATENT DOCUMENTS

| | | | |
|---|---|---|---|
| 5,164,912 A | 11/1992 | Osborne et al. | |
| 5,922,079 A * | 7/1999 | Booth et al. | 714/26 |
| 6,338,148 B1 | 1/2002 | Gillenwater et al. | |
| 6,845,307 B2 | 1/2005 | Rother | |
| 6,948,140 B2 | 9/2005 | Parker et al. | |
| 7,028,290 B2 | 4/2006 | Srivastava et al. | |
| 7,142,960 B2 | 11/2006 | Grier et al. | |
| 7,209,860 B2 | 4/2007 | Trsar et al. | |
| 7,536,600 B2 | 5/2009 | Fay et al. | |
| 7,840,844 B2 | 11/2010 | Garland et al. | |
| 7,904,270 B2 | 3/2011 | Bohizic et al. | |
| 2002/0007237 A1 | 1/2002 | Phung et al. | |
| 2009/0094076 A1 | 4/2009 | Reddy | |

OTHER PUBLICATIONS

Pham, D. and Grant, P. Blind separation of mixture of independent sources through a quasi-maximum likelihood approach. Jul. 1997, IEEE Transactions of Signal Processing, V45(7), pp. 1712-1725.*
Nath, M. Independent component analysis of real data. 2009, 2009 Seventh international conference on advances in pattern recognition. pp. 149-152.*
European Patent Office, European Office Action for Application No. 12 163 242.6 dated Oct. 5, 2012.
European search report for application No. 12 163 242.6 dated Sep. 14, 2012.
Official Journal EPO, XP007905525 pp. 592-93 "Notice from the European Patent Office concerning business methods dated, Oct. 1, 2007".
Bell, A.: "The World Beyond Second-order Statistics" Chapter 2 of Lee, T.-W. "Independent Component Analysis" Springer Science + Media Dordrecht 1998, pp. 27-28.

* cited by examiner

*Primary Examiner* — Jonathan C Teixeira Moffat
*Assistant Examiner* — Joseph J Yamamoto
(74) *Attorney, Agent, or Firm* — Ingrassa Fisher & Lorenz P.C.

(57) ABSTRACT

Methods, systems and apparatus are provided for ranking tests of interest. A set of failure modes of interest and a set of tests of interest are determined. A differentiation factor is then computed for each of the tests of interest, and each of the tests of interest can then be ranked based on their respective differentiation factors.

20 Claims, 13 Drawing Sheets

EXPRESSIONS AND EQUATIONS RELATED TO FAILURE MODES OF INTEREST $ln(L(fm_{max})) - ln(L(fm_j)) \leq c, fm_j \in FC$    EXPRESSION (3-1)

$Differentiation\ Factor\ (T) = 0, |FI| = 1$    EQUATION (3-2)

$R_{T \to fi} \subseteq R_{T \to FI} \subseteq R_T$    EXPRESSION (3-3)

$R_{T \to FI} \cup R_{T \nrightarrow FI} = R_T$    EXPRESSION (3-4)

$R_{T \to FI} \cap R_{T \nrightarrow FI} = \emptyset$    EXPRESSION (3-5)

FIG. 3A

EQUATION FOR DIFFERENTIATION FACTOR FOR MUTUALLY EXCLUSIVE TESTS:

$$Differentiation\ Factor\ (T \in T_{ME}) =  \begin{cases} 0, & |FI_T| = 0 \\ c_r + \left(\left(\frac{|R_{T \to fi}|}{|R_T|}\right)(1-c_r)\right), & 0 < |FI_T| < |FI|-1 \\ c_r + \left(\left(\frac{|R_{T \to fi}| + |R_{T \backslash \to FI}|}{|R_T|}\right)(1-c_r)\right), & |FI_T| = |FI|-1 \\ \left(\left(\frac{|R_{T \to FL}|}{|R_T|}\right)c_r\right) + \left(\left(\frac{|R_{T \to fi}|}{|R_T|}\right)(1-c_r)\right), & (|FI_T| = |FI|) \wedge (|R_{T \to FI}| \neq 1) \\ 0, & (|FI_T| = |FI|) \wedge (|R_{T \to FI}| = 1) \end{cases}$$

EQUATION (3-6)

FIG. 3B

EQUATION FOR DIFFERENTIATION FACTOR FOR MUTUALLY EXCLUSIVE TESTS:

$$\text{Differentiation Factor } (T \in T_{NME}) =\begin{cases} 0, & |FI_T| = 0 \\ c_r + \left(\left(\frac{|R_{T \to fi}|}{2|R_{T \to FI}|}\right)(1-c_r)\right), & 0 < |FI_T| < |FI| - 1 \\ c_r + \left(\left(\frac{1 + |R_{T \to fi}|}{2|R_{T \to FI}|}\right)(1-c_r)\right), & |FI_T| = |FI| - 1 \\ \left(\left(\frac{2|R_{T \to FI}| - 2}{2|R_{T \to FI}|}\right)c_r\right) + \left(\left(\frac{|R_{T \to fi}|}{2|R_{T \to FI}|}\right)(1-c_r)\right), & (|FI_T| = |FI|) \land (|R_{T \to FI}| \neq 1) \\ 0, & (|FI_T| = |FI|) \land (|R_{T \to FI}| = 1) \end{cases}$$

EQUATION (3-7)

FIG. 3C

EQUATIONS FOR UNCERTAINTY FACTOR $Uncertainty\ Factor\ (T) = 0,\ 0 < |FI_T| < |FI| - 1$  EQUATION (4-1)

$Uncertainty\ Factor\ (T) = 1,\ (|FI_T| = |FI|) \wedge (|R_{T \to FI}| = 1)$  EQUATION (4-2)

FIG. 4A

EQUATIONS FOR UNCERTAINTY FACTOR FOR MUTUALLY EXCLUSIVE TESTS $$\text{Uncertainty Factor}\,(T \in T_{ME}) = \frac{|R_T \setminus FI|}{|R_T|},\ (|FI_T| = |FI|) \wedge (|R_{T \to FI}| \neq 1) \quad \text{EQUATION (4-3)}$$

$$\text{Uncertainty Factor}\,(T \in T_{ME}) = 1 - \frac{|R_{T \to FI}|}{|R_T|},\ (|FI_T| = |FI|) \wedge (|R_{T \to FI}| \neq 1) \quad \text{EQUATION (4-4)}$$

$$\text{Uncertainty Factor}\,(T \in T_{ME}) = \begin{cases} 1, & |FI_T| = 0 \\ 0, & 0 < |FI_T| < |FI| \\ \frac{|R_{T \to FI}|}{|R_T|}, & (|FI_T| = |FI|) \wedge (|R_{T \to FI}| \neq 1) \\ 1, & (|FI_T| = |FI|) \wedge (|R_{T \to FI}| = 1) \end{cases} \quad \text{EQUATION (4-5)}$$

FIG. 4B

EQUATIONS FOR UNCERTAINTY FACTOR FOR NON-MUTUALLY EXCLUSIVE TESTS $$Uncertainty\ Factor\ (T\epsilon T_{NME}) = \frac{2}{2^{|R_T \to FI|}} \qquad \text{EQUATION (4-6)}$$

$$Uncertainty\ Factor\ (T\epsilon T_{NME}) = \begin{cases} 1, & |FI_T| = 0 \\ 0, & 0 < |FI_T| < |FI| \\ \dfrac{2}{2^{|R_T \to FI|}}, & (|FI_T| = |FI|) \wedge (|R_T \to FI| \neq 1) \\ 1, & (|FI_T| = |FI|) \wedge (|R_T \to FI| = 1) \end{cases} \qquad \text{EQUATION (4-7)}$$

FIG. 4C

EQUATIONS FOR SEPARATION FACTOR $Separation\ Factor\ (T) = 0, \quad |FI_T| = 0$ EQUATION (5-1)

$Separation\ Factor\ (T) = 0, \quad (|FI_T| = |FI|) \wedge (|R_{T \to FI}| = 1)$ EQUATION (5-2)

FIG. 5A

EQUATIONS FOR SEPARATION FACTOR FOR MUTUALLY EXCLUSIVE TESTS $$\text{Separation Factor } (T \in T_{ME}) = \frac{|R_{T \to fi}|}{|R_T|}, \quad |FI_T| < |FI| - 1 \quad \text{EQUATION (5-3)}$$

$$\text{Separation Factor } (T \in T_{ME}) = \frac{|R_{T \to fi}| + |R_{T \to FI}|}{|R_T|}, \quad |FI_T| = |FI| - 1 \quad \text{EQUATION (5-4)}$$

$$\text{Separation Factor } (T \in T_{ME}) = \frac{|R_{T \to fi}|}{|R_T|}, \quad (|FI_T| = |FI|) \wedge (|R_{T \to FI}| \neq 1) \quad \text{EQUATION (5-5)}$$

$$\text{Separation Factor } (T \in T_{ME}) = \begin{cases} 0, & |FI_T| = 0 \\[4pt] \dfrac{|R_{T \to fi}|}{|R_T|} & 0 < |FI_T| < |FI| - 1 \\[8pt] \dfrac{|R_{T \to fi}| + |R_{T \to FI}|}{|R_T|} & |FI_T| = |FI| - 1 \\[8pt] \dfrac{|R_{T \to fi}|}{|R_T|} & (|FI_T| = |FI|) \wedge (|R_{T \to FI}| \neq 1) \\[8pt] 0, & (|FI_T| = |FI|) \wedge (|R_{T \to FI}| = 1) \end{cases}$$

EQUATION (5-6)

FIG. 5B

EQUATIONS FOR SEPARATION FACTOR FOR MUTUALLY EXCLUSIVE TESTS $$\text{Separation Factor } (T \in T_{NME}) = \frac{|R_{T \to fi}|}{2|R_{T \to FI}|}, \quad |FI_T| < |FI| - 1 \quad \text{EQUATION (5-7)}$$

$$\text{Separation Factor } (T \in T_{NME}) = \frac{1 + |R_{T \to fi}|}{2|R_{T \to FI}|}, \quad |FI_T| = |FI| - 1 \quad \text{EQUATION (5-8)}$$

$$\text{Separation Factor } (T \in T_{NME}) = \frac{|R_{T \to fi}|}{2|R_{T \to FI}|}, \quad (|FI_T| = |FI|) \wedge (|R_{T \to FI}| \neq 1) \quad \text{EQUATION (5-9)}$$

$$\text{Separation Factor } (T \in T_{NME}) = \begin{cases} 0, & |FI_T| = 0 \\[6pt] \dfrac{|R_{T \to fi}|}{2|R_{T \to FI}|}, & 0 < |FI_T| < FI - 1 \\[10pt] \dfrac{1 + |R_{T \to fi}|}{2|R_{T \to FI}|}, & |FI_T| = |FI| - 1 \\[10pt] \dfrac{|R_{T \to fi}|}{2|R_{T \to FI}|}, & (|FI_T| = |FI|) \wedge (|R_{T \to FI}| \neq 1) \\[10pt] 0, & (|FI_T| = |FI|) \wedge (|R_{T \to FI}| = 1) \end{cases} \quad \text{EQUATION (5-10)}$$

METHODS SYSTEMS AND APPARATUS FOR RANKING TESTS USED TO IDENTIFY FAULTS IN A SYSTEM

STATEMENT REGARDING FEDERALLY SPONSORED RESEARCH OR DEVELOPMENT

This invention was made with Government support under Agreement No. W56 HZV-05-C-0724 awarded by the US Army. The Government has certain rights in this invention.

TECHNICAL FIELD

The disclosed embodiments generally relate to computer-based methods for fault identification in a system, and more particularly relate to methods, systems and apparatus for ranking tests used to identify or isolate faults in a system.

BACKGROUND

When a system experiences a fault or failure, diagnostic tests can be performed to identify or isolate the fault (e.g., the source of the fault and/or other details regarding the fault). In many systems more than one test can be done to identify or isolate the fault. The tests that are performed to identify or isolate a particular fault condition, and the order in which they are performed, is either random or at the discretion of testing personnel. One drawback of this approach is that it can be an inefficient and time-consuming endeavor particularly as the number of different tests that can be used to attempt to identify or isolate the fault increases. The capabilities of the different tests to identify or isolate the fault can vary. Not all tests are equal in their capability to identify or isolate a particular fault condition.

There is a need for methods, systems and apparatus that can be used to determine which tests are most effective in identifying or isolating a particular fault condition.

It would be desirable to provide improved methods, systems and apparatus for ranking tests used to identify or isolate faults in a system. Furthermore, other desirable features and characteristics of the present invention will become apparent from the subsequent detailed description of the invention and the appended claims, taken in conjunction with the accompanying drawings and this background of the invention.

BRIEF SUMMARY

Methods, systems and apparatus are provided for ranking tests used to identify or isolate faults or fault conditions in a system.

In accordance with one embodiment, a method is provided for ranking tests of interest. A set of failure modes of interest and a set of tests of interest are determined A differentiation factor is then computed for each of the tests of interest, and each of the tests of interest can then be ranked based on their respective differentiation factors.

BRIEF DESCRIPTION OF THE DRAWINGS

The present invention will hereinafter be described in conjunction with the following drawing figures, wherein like numerals denote like elements.

FIGS. 3 (A-C) illustrate various equations and expressions that are applicable to the method of FIG. 2 in accordance with some of the disclosed embodiments.

FIGS. 4 (A-C) illustrate various equations and expressions that can be used to describe the uncertainty factor that is described with reference to FIG. 2 in accordance with some of the disclosed embodiments.

FIGS. 5 (A-C) illustrate various equations and expressions that can be used to describe the separation factor that is described with reference to FIG. 2 in accordance with some of the disclosed embodiments.

DETAILED DESCRIPTION

The following detailed description is merely exemplary in nature and is not intended to limit the invention or the application and uses of the invention. As used herein, the word "exemplary" means "serving as an example, instance, or illustration." Any embodiment described herein as "exemplary" is not necessarily to be construed as preferred or advantageous over other embodiments. Furthermore, there is no intention to be bound by any theory presented in the preceding background or the following detailed description.

TERMINOLOGY

Throughout this disclosure some terms are referenced that will now be defined as follows.

As used herein, the term "module" can refer to a sub-system or component of a complex system. A module can be a hardware module, a software module or a combination thereof. As used herein the term "hardware module" can refer to a device, a circuit, an electrical component, or other hardware-based component for performing a task, whereas a "software module" can refer to a software-based component for performing a task.

As used herein, the term "fault condition (FC)" refers to a software entity or structure that provides a "variable" representation of an underlying failure mode that is occurring in a complex system. A fault condition may be constructed without knowing which of several failure modes is actually occurring. A fault condition is designed to hold the binary and/or complex evidence, an ambiguity set/group, etc.

As used herein, the term "failure mode (fm)" refers to a physical phenomena caused by adverse events (e.g., a physical defect) that degrade functionality of a complex system such that the system no longer meets one or more specified requirements. A failure mode can be represented internally in an analysis system. This internal representation is also referred to as a "failure mode."

As used herein, the term "test" refers to a procedure which when executed will provide additional diagnostic evidence. The diagnostic evidence provided by the test can then be used to help isolate a fault condition. As will be explained in greater detail below, a test is either mutually exclusive or non-mutually exclusive, but it can not be both. A test (T) has one or more results or a set of results ($R_T$) for that test. As used herein, the term "result" refers to a result of a test. Each result can be associated with one or more failure modes; however, not all results are required to be associated with a failure mode. Therefore, by the relationship of results ($R_T$) in test and the failure modes that are associated with those results ($R_T$), the test is associated with a set of failure modes ($FM_T$). The set of failure modes ($FM_T$) associated with the test is a subset of the set of all failure modes. The set of results ($R_T$) associated with the test is a subset of the set all results (R).

Overview

Figure 1:
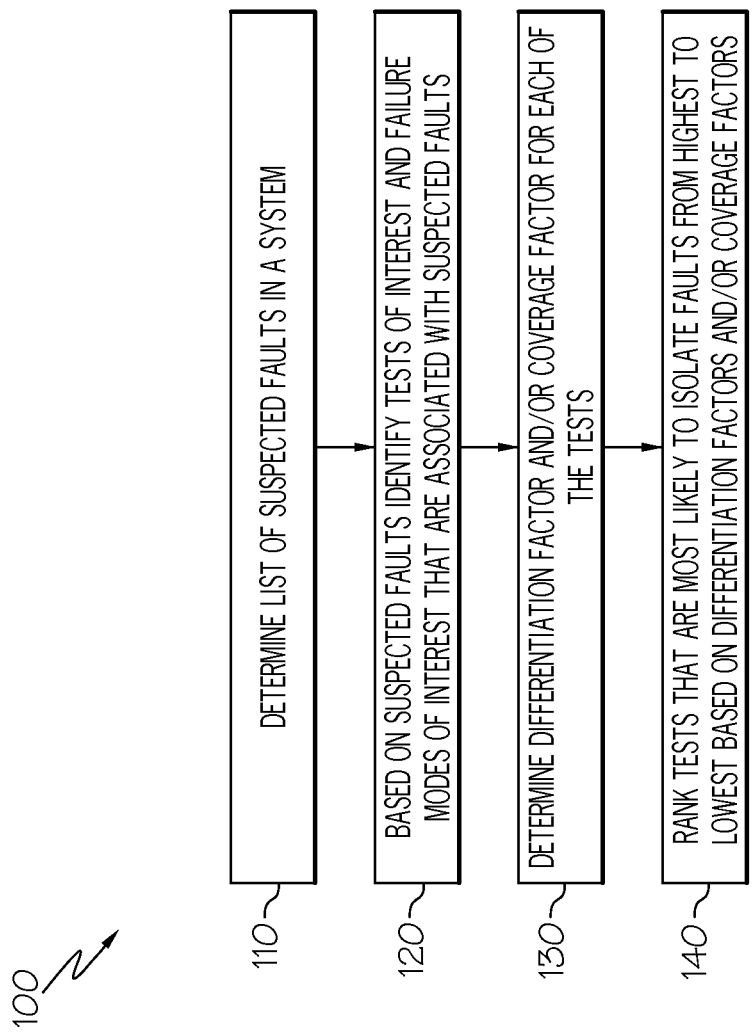
FIG. 1 illustrates a method in accordance with some of the disclosed embodiments.

FIG. 1 illustrates a method 100 for ranking tests in accordance with some of the disclosed embodiments. The method 100 is designed so that the faults that resulted in the system failure can be indentified in an efficient way by requiring a minimum or reduced number of tests to identify or isolate the faults.

At 110, suspected faults from a failed system are determined, and at 120, based on the suspected faults, the tests that are associated with the suspected faults and that are of interest and failure modes of interest are identified. At 130, a differentiation factor and/or coverage factor can be determined for each of the tests that were identified at 120. The differentiation factor and coverage factor that is determined for each test allow the tests to be ranked so that each test should provide additional differentiation to the significant failure modes in the fault condition's failure mode ambiguity group. At 140, based on differentiation factors and/or coverage factors, the tests that are most likely to identify or isolate faults are ranked from highest to lowest. The tests are ranked so that each test should provide additional differentiation to the significant failure modes in the fault condition's failure mode ambiguity group. The tests can be ranked based on the suspected faults and their likelihood of occurrence so that the tests can be ranked in an order from highest to lowest and so that the ranking will result in a test ordering that can provide the most efficient evidence to isolate the faults.

Figure 2:
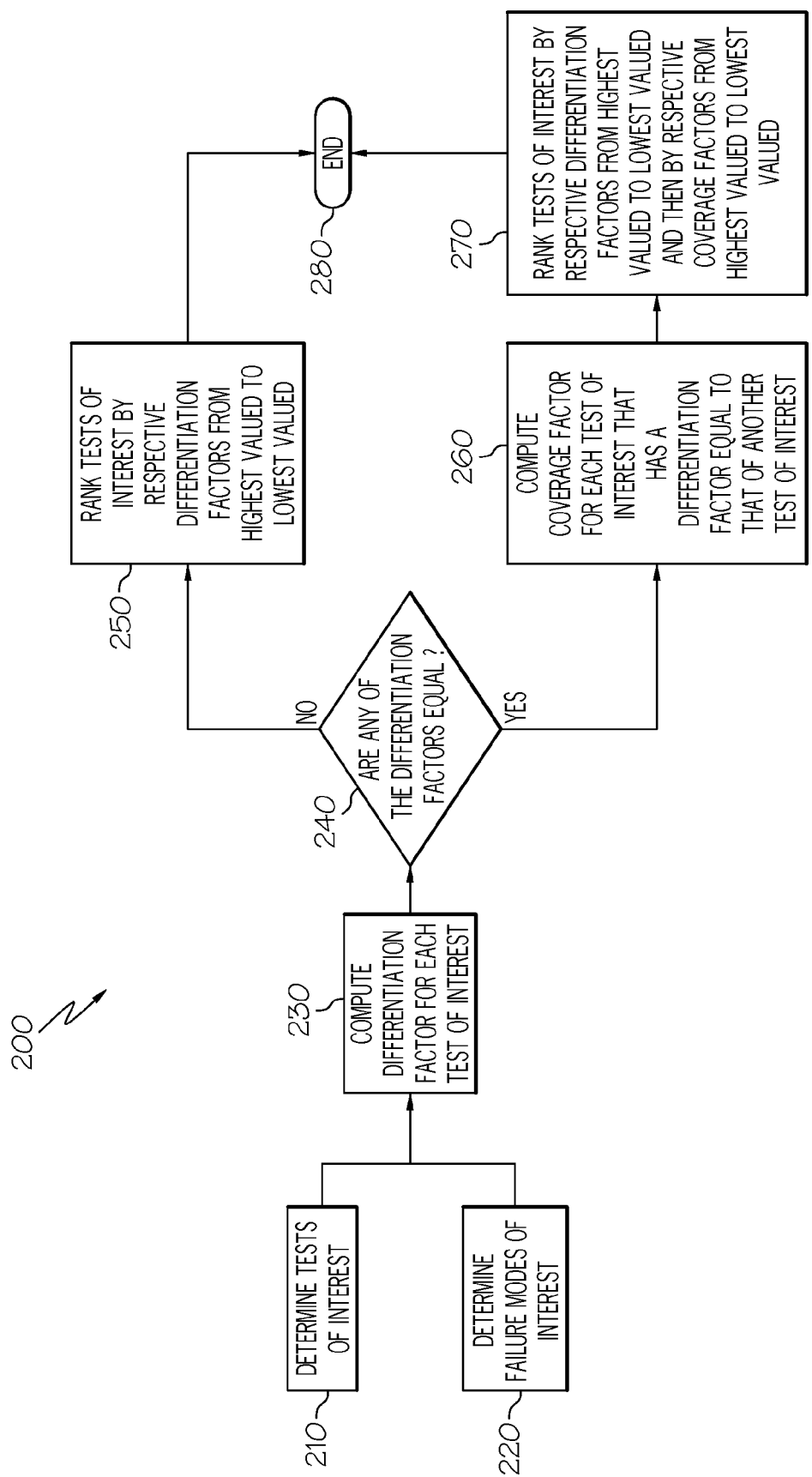
FIG. 2 illustrates a method in accordance with some of the disclosed embodiments.

FIG. 2 illustrates a method 200 in accordance with some of the disclosed embodiments. FIG. 3 illustrates various equations and expressions that are applicable to the method 200 of FIG. 2, and that will be described with reference to FIG. 2. In the various equations and expressions illustrated in FIG. 3 various symbols are used as illustrated in table 1 below, which provides a list of variables in column 1 and equivalent expressions for some of the variables in column 2.

TABLE 1

| Variable | Equivalent Expression |
| --- | --- |
| Ranking Constant ($c_r$) | |
| Isolation Constant (c) | |
| A Failure Mode (fm) | |
| Set of all Failure Modes (FM) | $\{fm\} \equiv FM$ |
| The Fault Condition (FC) | |
| Set of Failure Modes in the Fault Condition's Failure Mode Ambiguity Group ($FM_{FC}$) | $\{fm \in FC\} \equiv FM_{FC}$ |
| Set of Failure Mode of Interest (FI) | $\{fm \in FI\} \equiv FI$ |
| Number of Failure Modes of Interest (|FI|) | |
| A Failure Mode of Interest (fi) | $fm \in FI \equiv fi$ |
| Set of Mutually Exclusive Tests ($T_{ME}$) | |
| Set of Non-Mutually Exclusive Tests ($T_{NME}$) | |
| Set of Tests of Interest (TI) | $\{F \to (fm \in FM_{FC})\} \equiv TI$ |
| The Test (T) | |
| Set of Failure Modes associated with the Test ($FM_T$) | $\{fm \to T\} \equiv FM_T$ |
| A Result (r) | |
| Set of all Results (R) | $\{r\} \equiv R$ |
| Set of Results in the Test ($R_T$) | $\{r \in T\} \equiv R_T$ |
| Set of Failure Modes of Interest associated with the Test ($F_{LT}$) | $FI \cap FM_T \equiv FI_T$ |
| Number of Failure Modes of Interest associated with the Test (|$FI_t$|) | |
| Set of Results in the Test Associated with One or More Failure Modes of Interest ($R_{t \to FI}$) | $\{(r \in T) \to FI\} \equiv R_{T \to FI}$ |
| Number of the Results in the Test associated with one or more Failure Mode of Interest (|$R_{T \to FI}$|) | |

TABLE 1-continued

| Variable | Equivalent Expression |
| --- | --- |
| Set of the Results in the Test associated with only one Failure Mode of Interest ($R_{t \to fi}$) | $\{(r \in T)|FI\} \equiv R_{T \to fi}$ |
| Set of the Results in the Test not associated with a Failure Mode of Interest ($R_{t \to FI}$) | $R_T - R_{T \to FI} \equiv R_{T \to \overline{FI}}$ |
| Number of the Results in the Test not associated with a Failure Mode of Interest (|$R_{T \to \overline{FI}}$|) | |

Method 200 starts at 210, where tests of interest are determined. As used herein, the term "test of interest" refers to any test with a test result which is associated with any failure mode (fm) in the fault condition's failure mode ambiguity group. The set of tests of interest (TI) includes any test (either mutually exclusive or non-mutually exclusive) which has at least one result that is associated with at least one failure mode in the fault condition's failure mode ambiguity group. The set of all tests of interest (TI) are the tests which are ranked for the fault condition. While the tests of interest (TI) include tests which are not associated with a failure mode of interest, these tests will be ranked last; however, both a differentiation factor and a coverage factor of such a test will be 0.

At 220, failure modes of interest are determined. As used herein, the term "failure mode of interest (fi)" refers to any failure mode (fm) in the fault condition's failure mode ambiguity group that is significant based on the isolation constant. The group of failures modes of interest is a subset of the suspected failure modes that are in the failure mode ambiguity group. The group of failure modes of interest includes the failure mode with the greatest likelihood as well has any other failure mode which has a likelihood great enough to prevent isolation of the top ranked failure mode. The isolation constant determines how much greater the top ranked failure mode likelihood needs to be in comparison to the second top ranked failure mode likelihood in order to isolate the fault condition. As used herein, the term "failure mode ambiguity group ($FM_{FC}$)" refers to a set of failure modes (usually more than one) that cannot be resolved, where a particular failure mode in the ambiguity group that is causing the fault condition is unknown. The terms ambiguity set and ambiguity group are used interchangeably herein and will oftentimes be described as an ambiguity set/group. Any failure mode in the set/group that makes up the ambiguity set/group can be the cause of the fault condition. Each of the failure modes in the ambiguity set/group has a unique probability of being the actual failure mode that is occurring in the complex system. These probabilities can be different from each other and may be unknown to the analysis system. For example, in the ambiguity set/group {bent-shaft, chipped-bearing}, the probabilities associated with these failure modes could be 0.1 and 0.8 respectively, making the second (chipped-bearing) the more likely underlying failure mode.

The set of failure modes of interest (FI) includes the failure mode in the fault condition's failure mode ambiguity group with the greatest individual likelihood ($fm_{max}$), and all other failure modes in the fault condition's failure mode ambiguity group which have an individual likelihood which can prevent the fault condition from isolating to the top failure mode. The set of failure modes of interest (FI) is a subset of the failure modes in the fault condition's failure mode ambiguity group ($FM_{FC}$). The group of failure modes of interest is found from the fault condition's failure mode ambiguity group by using an isolation constant (c). As used herein, the term "isolation constant (c)" refers to a configurable value used when deciding if a fault condition can be isolated to a failure mode (fm) or group of corrective actions. As used herein, the term "corrective action" refers to a procedure used to fix or correct the fault.

Given the failure mode in the fault condition's failure mode ambiguity group with the greatest individual likelihood ($fm_{max}$), the failure modes of interest will include any failure mode ($fm_j$) if Expression (3-1) of FIG. 3A is true. The failure modes of interest group is comprised of the failure mode with the greatest individual likelihood and the failure modes with an individual likelihood high enough to prevent the fault condition from isolating to a failure mode. Therefore, if a fault condition can be isolated to a failure mode, the only failure mode in the failure modes of interest group will be the isolated failure mode. As shown in Equation (3-1) of FIG. 3A, in the event that the failure modes of interest group contains only one failure mode of interest, the differentiation factor for all of the tests of interest is 0. As shown in Expression (3-3) of FIG. 3A, the results of a test ($R_T$), which are associated with one or more failure modes of interest, are a subset of results of the test. The set of results of the test, which are associated with only one failure mode of interest, is a subset of the results of the test which are associated with one or more failure modes of interest. As shown in Expressions (3-4) and (3-5) of FIG. 3A, a test result is either associated with a failure mode of interest or the test result is not associated with a failure mode of interest.

At 230, a differentiation factor is computed for each of the tests of interest. The differentiation factor has a value that is between zero and one. As used herein, the term "differentiation factor" refers to a composite index that is made up of an ambiguity factor (or alternatively an uncertainty factor), a separation factor, and a ranking constant ($c_r$).

As used herein, the term "ambiguity factor" refers to the probability that the test will provide some information to differentiate between the failure modes of interest, but not separate out a single failure mode of interest. The ambiguity factor has a value that is between zero and one. The ambiguity factor is the sum of:
  (1) the probability that the test will increase the likelihood of more than one failure mode of interest, but not increase the likelihood of all failure modes of interest; and
  (2) the probability that the test will decrease the likelihood of at least one failure mode of interest, but not decrease the likelihood of all but one failure mode of interest, and not decrease the likelihood of all failure modes of interest, and not increase the likelihood of any failure mode of interest.

Each outcome which is not counted towards the uncertainty factor or the separation factor can be counted towards the ambiguity factor. Thus the ambiguity factor is the number of outcomes not counted towards either the uncertainty factor or the ambiguity factor divided by the number of outcomes. The ambiguity factor should be ranked high to low so that given the same separation factor it is better to run a test with a higher ambiguity factor.

As used herein, the term "uncertainty factor" refers to the probability that a test will provide no information to differentiate between the likelihoods of the failure modes of interest. The uncertainty factor has a value that is between zero and one. The uncertainty factor is the sum of:
  (1) the probability that the test will not affect the likelihood of any failure modes of interest;
  (2) the probability that the test will increase the likelihood of all failure modes of interest; and
  (3) the probability that the test will decrease the likelihood of all failure modes of interest.

The uncertainty factor can be calculated by adding up the number of outcomes of the test which will not affect the likelihood of a failure mode of interest plus the number of outcomes of the test which will increase all failure modes of interest, and the number of outcomes that will decrease the likelihood of all failure modes of interest and then dividing by the number of outcomes. The uncertainty factor should be ranked low to high so that given the same separation factor it is better to run a test with a lower uncertainty factor.

As used herein, the term "separation factor" refers to the probability that the test will separate out one and only one of the failure modes of interest from the rest of the failure modes of interest. The separation factor has a value that is between zero and one. The separation factor is the sum of:
  (1) the probability that the test will increase the likelihood of only one failure mode of interest; and
  (2) the probability that the test will decrease the likelihood of all but one failure modes of interest and does not also increase the likelihood of only one failure mode of interest.

The separation factor can be calculated by adding up the number of outcomes which will increase the likelihood of only one failure mode of interest plus the number of outcomes which will decrease the likelihood of all but one failure mode of interest but not increase the likelihood of one failure mode of interest divided by the number of outcomes. The separation factor should be ranked high to low so that it is better to run a test with a higher separation factor.

As shown in Equation (1) below, the sum of the uncertainty factor, separation factor, and ambiguity factor is one.

Uncertainty Factor+Separation Factor+Ambiguity Factor=1,  Equation (1).

The uncertainty factor, separation factor, and ambiguity factor are all based upon the number of possible outcomes of the test. Each possible outcome would cause an increase in the likelihood of specific failure modes and/or a decrease in the likelihood of specific failure modes. Following the description of method 200, characteristics of the uncertainty factor, separation factor, and ambiguity factor will each be described in greater detail below.

As shown in Equation (2), the ambiguity factor and the separation factor can be combined into one differentiation factor as follows:

Differentiation Factor=Separation Factor+(Ambiguity Factor)·$c_r$,  Equation (2), where $c_r$ is the ranking constant. As used herein, the term "ranking constant ($c_r$)" refers to a configurable value that can be used in computing the differentiation factor. In one implementation, the ranking constant ($c_r$) is a configurable, constant value that can be chosen and configured before the method 200 executes (e.g., is not determined at run time). The ranking constant ($c_r$) allows for tunable control over the degree to which the uncertainty factor and the separation factor play into the differentiation factor. In one implementation, the ranking constant ($c_r$) is a configurable value that must be greater than or equal to 0 and less than or equal to 1. A default value for the ranking constant ($c_r$) can be 0.5 in some implementations. Although the ranking constant ($c_r$) must be greater than or equal to 0 and less than or equal to 1, in some implementations, it is recommended that ranking constant not be equal to 0 or to 1, but configuring the ranking constant very close to 0 or to 1 is a valid choice.

By using the ranking constant ($c_r$), the degree to which the ambiguity factor contributes to the ranking can be diminished. As shown in Equation (2), this is done by giving the ambiguity factor only a factional weight towards the differentiation factor. The sum of the separation factor plus the ambiguity factor is the probability that a test will give results that distinguish between the failure modes of interest. Unlike the outcomes counted towards the uncertainty factor, both of the outcomes counted toward the separation factor and the outcomes counted towards the ambiguity factor are desirable outcomes of a test. However, it is more desirable that the outcome of the test allows a single failure mode of interest to be separated out (as given by the outcomes counted towards the separation factor) as opposed to separating out a group of failure modes and thereby continuing to leave the fault condition ambiguous (as given by the outcomes counted towards ambiguity factor).

As will be explained in greater detail below, Equation (2) can also be written in terms of the separation factor and the uncertainty factor in Equation (3) as follows:

Differentiation Factor=((1−Uncertainty Factor)·$c_r$)+ (Separation Factor)·(1−$c_r$)  Equation (3).

When the ranking constant ($c_r$) in Equation (3) is equal to 1, then the differentiation factor is equal to 1 minus the uncertainty factor. In other words, the differentiation factor is composed only of the uncertainty factor, meaning that tests are only ranked by using the uncertainty factor, and the separation factor is ignored. As the ranking constant ($c_r$) approaches 1, but remains less than 1, the differentiation factor will cause tests to be ranked primarily by the uncertainty factor, and only in the case of equal uncertainty factors will the separation factor be used to distinguish between them.

Likewise when the ranking constant ($c_r$) is equal to 0, then the differentiation factor is equal to the separation factor, and the uncertainty factor will be ignored, meaning tests are ranked only based upon the separation factor. If the ranking constant ($c_r$) is equal to 0.5, this gives equal weight to the uncertainty factor and the separation factor.

Because the differentiation factor combines both the uncertainty factor and the separation factor into one term, the differentiation factor is the only term that is used in the ranking unless there is a need to break ties between equal differentiation factors, in which case a coverage factor can be used to further differentiate between the equal differentiation factors. Because of this, in some embodiments, as shown in Equations (3-6) and (3-7) of FIGS. 3(A-C), the differentiation factor can be calculated directly without having to calculate the uncertainty factor or the separation factor.

The tests of interest are ranked by the differentiation factor from high to low. At 240, for each of the tests of interest, a determination is made as to whether or not any of the differentiation factors computed at 230 are equal.

When none of the differentiation factors computed at 230 are equal, the method 200 proceeds to 250, where each of the tests of interest is ranked based on their respective differentiation factors that were computed at 230, where the corresponding differentiation factors are ranked from high values to low values.

When two or more of the differentiation factors computed at 230 are equal (e.g., if two or more of the tests of interest have equal differentiation factors), the method 200 proceeds to 260, where a coverage factor is computed for each of the tests that have equal differentiation factors so that the ranking of these tests with equal differentiation factors can be distinguished by a coverage factor. As used herein, the term "coverage factor" refers to the average number of test results associated with a failure mode of interest. The coverage factor has a value that is between zero and infinity. For tests which have the same differentiation factor (in other words the same uncertainty factor and same separation factor), the coverage factor is used to distinguish between these tests.

In one embodiment, the coverage factor of a test is the number of the test's results which are associated with a failure mode of interest ($|R_{T \to FI}|$) divided by the number of failure modes of interest ($|FI|$).

Following 260, method 200 proceeds to 270, where each of the tests of interest is ranked based on their respective differentiation factors that were computed at 230, and then, each of the tests that have equal differentiation factors are ranked based on their respective coverage factors from high to low.

Characteristics of the Uncertainty Factor and the Separation Factor According to Some of The Disclosed Embodiments To facilitate understanding of the uncertainty factor and separation factor, an explanation of the characteristics of these factors will now be provided with reference to FIGS. 4(A-C) and 5(A-C). The uncertainty factor and the separation factor have different characteristics depending on whether the test is a mutually exclusive test or a non-mutually exclusive test.

Distinctions Between a Mutually Exclusive Test and a Non-Mutually Exclusive Test As used herein, the term "mutually exclusive test" refers to a test where only one result associated with the test will be indicting and all other results associated with the test will be exonerating. As used herein, the term "indicting result" refers to a result that indicates it is more likely that associated failure modes are being caused by the fault. As used herein, the term "exonerating result" refers to a result that indicates it is less likely that the associated failure modes are being caused by the fault. A test (T) is considered to be mutually exclusive when the test will return one and only one indicting result and all other results associated with the mutually exclusive test will be exonerating. In a mutually exclusive test, a single result is selected from the list of possible results. The selected result translates into an indicting result, and all other results are translated into exonerating results. The number of possible outcomes for a mutually exclusive test is equal to a number of results ($|R_T|$) in the test. Because more than one result in a mutually exclusive test cannot be indicting, a specific failure mode cannot be associated with more than one result in a mutually exclusive test. Otherwise, indicting the failure mode by selecting one of the results associated with the failure mode, would also exonerate the failure mode because the other result associated with the failure mode would have to be exonerating. Due to the fact that a failure mode cannot be associated with more than one result in a mutually exclusive test, the coverage factor of a mutually exclusive test must be less than or equal to 1.

As used herein, the term "non-mutually exclusive test" refers to a test where any number of results associated with the test can be indicting and the rest can be exonerating. A test is considered to be non-mutually exclusive when the outcome of the test is that any number of the results in the test can be indicting and any number of the results in the test can be exonerating. For example, a non-mutually exclusive test can be a "check all that apply" test, where checked results translate into indicting results and unchecked results translate into exonerating results. Another example of a non-mutually exclusive test is a list of one or more questions, each of which translates into either an indicting or exonerating result. The probability of unknown results (or the probability of unanswered questions) can be ignored by a test ranking method. It is assumed that if a non-mutually exclusive test is executed, all of the results in a test will return either an indicting or exonerating result.

In a non-mutually exclusive test, any number of results can be selected; thus unlike results of a mutually exclusive test, results of a non-mutually exclusive test are independent of each other in that each result independently returns as either indicting or exonerating. Therefore, in a non-mutually exclusive test there are $2^{|R_T|}$ possible outcomes, two possible outcomes for each result, meaning either the result is indicting or exonerating. Because the results are independent of each other, any result in a non-mutually exclusive test which is not associated with a failure mode of interest cannot affect the likelihood of a failure mode of interest. Therefore, these results have no effect on the probability that the outcome of a non-mutually exclusive test will have an effect on likelihood of a failure mode of interest and can therefore effectively be ignored. Given that a test ranking algorithm can ignore any result which is not associated with a failure mode of interest, there are $2^{|R_{T \to FI}|}$ possible outcomes that can have a different effect on the failure modes of interest. Unlike a mutually exclusive test, a specific failure mode can be associated with more than one result in a non-mutually exclusive test.

Uncertainty Factor

FIGS. 4(A-C) illustrate various equations and expressions that can be used to describe the uncertainty factor that is described with reference to FIG. 2.

When there are no failure modes of interest associated with a test ($|FI_T|=0$), it is 100% certain that the test (T) will not affect the likelihood of any of the failure modes of interest. Therefore, the uncertainty factor of a test (T) which is not associated with any failure modes of interest is 1.

When the test (T) is associated with at least one failure mode of interest, it is 100% certain that the test (T) will affect the likelihood of a failure mode of interest; meaning there is a 0% probability that the test (T) will not affect the likelihood of a failure mode of interest.

When not all failure modes of interest are covered by the test (T), it is 100% certain that the test (T) will not increase the probability of all failure modes of interest, and 100% certain that the test (T) will not decrease the probability of all failure modes of interest; meaning there is a 0% probability that the test (T) will increase the likelihood of all failure modes of interest and a 0% likelihood that the test (T) will decrease the likelihood of all failure modes of interest. Therefore, as illustrated in Equation (4-1) of FIG. 4A, when the test (T) is associated with at least one failure mode of interest, but not associated with all failure modes of interest, the uncertainty factor is 0.

When the test (T) is associated with all failure modes of interest, but all failure modes of interest are associated with the same test (T) result then either the test (T) result that is associated with all the failure modes of interest is selected, in which case the outcome of the test (T) is that it increases the likelihood of all failure modes of interest, or the test (T) result associated with all the failure modes of interest is not selected, in which case the outcome of the test (T) is that it decreases the likelihood of all failure modes of interest. Therefore, as illustrated in Equation (4-2) of FIG. 4A, when a single test (T) result is associated with all failure modes of interest, it is 100% certain that the test (T) will either increase the probability of all failure modes of interest or decrease the likelihood of all failure modes of interest; thus the uncertainty factor is 1.

When the test (T) is associated with all failure modes of interest but not all failure modes of interest are associated with the same test (T) result, then the uncertainty factor will depend upon whether the test (T) is mutually exclusive or non-mutually exclusive test (T).

Uncertainty Factor of Mutually Exclusive Tests

When dealing with a mutually exclusive test that is associated with all failure modes of interest, there is a 0% probability that the outcome of the test (T) will not affect the likelihood of all failure modes of interest; thereby there is also a 0% probability that the test (T) will not affect the likelihood of a failure mode of interest, provided that the same result is not associated with all failure modes of interest, since only the failure modes associated with one result of a mutually exclusive test (T) will be increased there is a 0% probability that the likelihood of all failure modes of interest will increase.

The $|R_T|$ possible outcomes of a mutually exclusive test which is associated with all failure modes of interest, provided not all failure modes of interest are associated with the same result, can be divided into two categories. The first category is those for which the outcome is selecting a result which is associated with a failure mode of interest. The second category is those for which the outcome is selecting a result that is not associated with a failure mode of interest. For the first category, the outcome of selecting a result which is associated with a failure mode of interest is that there will be an increase in the likelihood of at least one failure mode of interest and a decrease in others. For the second category, the outcome will be a decrease in the likelihood of all failure modes of interest. Thus, as illustrated in Equation (4-3) and equivalent Equation (4-4) of FIG. 4B, given a test (T) which is associated with all failure modes of interest, provided all failure modes of interest are not associated with the same result, the probability that it will decrease the likelihood of all failure modes of interest is equal to the number of results not associated with a failure mode of interest divided by the number of results associated with the test (T).

As a whole the formula for calculating the uncertainty factor of a mutually exclusive test (T) is given in Equation (4-5) of FIG. 4B.

Uncertainty Factor of Non-Mutually Exclusive Tests

One of the $2^{|R_{T \to FI}|}$ possible outcomes of a non-mutually exclusive test (T), that is associated with all failure modes of interest, is that all results associated with a failure mode of interest return indicting, in this case the likelihood of all failure modes of interest increases. Another possible outcome of the $2^{|R_{T \to FI}|}$ possible outcomes is that all the results associated with a failure mode of interest return exonerating, in which case the likelihood of all failure modes of interest decreases. The other possible outcomes are that some of the results associated with a failure mode of interest return indicting and others return exonerating, meaning the probability of some failure modes of interest increase and the probability of some failure modes of interest decrease. Thus it can be said that for a non-mutually exclusive test (T) that is associated with all failure modes of interest, provided not all failure modes of interest are associated with the same result, the probability of increasing the likelihood of all failure modes of interest or decreasing the likelihood of all failure modes of interest is 2 divided by $2^{|R_{T \to FI}|}$ as shown in Equation (4-6) of FIG. 4C.

As a whole, the equations for calculating the uncertainty factor of a non-mutually exclusive test (T) are shown in Equation (4-7) of FIG. 4C.

Separation Factor

FIGS. 5 (A-C) illustrate various equations and expressions that can be used to describe the separation factor that are described with reference to FIGS. 5(A-C).

The separation factor depends heavily on whether the test (T) is mutually exclusive ($T_{ME}$) or non-mutually exclusive ($T_{NME}$). In cases where the uncertainty factor is 1, the separation factor is 0.

As shown in Equation (5-1) of FIG. 5A, when there are no failure modes of interest associated with the test (T), then the test (T) cannot affect the likelihood of a failure mode of interest; thus there is a 0% probability that the test (T) will increase the likelihood of only one failure mode of interest, and a 0% probability that the test (T) will decrease the likelihood of all but one failure mode of interest.

When there are at least two failure modes of interest that are not associated with the test (T), then there is a 0% probability that the test (T) decreases all but one failure mode of interest.

When the test (T) is associated with all failure modes of interest and all failure modes of interest are associated with the same test (T) result, then either the test (T) increases the likelihood of all failure modes of interest or it decreases the likelihood of all failure modes of interest. Therefore, as shown in Equation (5-2) of FIG. 5A, when there is a 0% probability that the test (T) increases the likelihood of only one failure mode of interest and a 0% probability that the test (T) decrease the likelihood of all failure modes of interest.

Separation Factor of Mutually Exclusive Tests

For a mutually exclusive test ($T_{ME}$), when a test (T) result is associated with only one failure mode of interest, selecting that result will increase the likelihood of that one failure mode of interest.

When a mutually exclusive test ($T_{ME}$) result is associated with more than one failure mode of interest, selecting that result will increase the likelihood of more than one failure mode of interest.

When a mutually exclusive test ($T_{ME}$) result is not associated with a failure mode of interest, selecting that result will not increase the likelihood of any failure modes of interest.

When there are at least two failure modes of interest that are not associated with a test (T), there is a 0% probability that the likelihood of all but one failure mode of interest will be decreased. Thus, as shown in Equation (5-3) of FIG. 5B, the separation factor for a mutually exclusive test ($T_{ME}$), which is not associated with at least two failure modes of interest, is equal to the number of results associated with only one failure mode of interest ($|R_{T \to fi}|$), divided by the number of results ($|R_T|$).

For the mutually exclusive test ($T_{ME}$) which is associated with all but one failure modes of interest, selecting any result which is not associated with a failure mode of interest will decrease the likelihood of all but one failure mode of interest. Thus, as shown in Equation (5-4) of FIG. 5B, for a mutually exclusive test ($T_{ME}$) which is associated with all but one failure mode of interest, the separation factor is equal to the sum of the number of results associated with only one failure mode of interest ($|R_{T \to fi}|$) plus the number of results not associated with a failure mode of interest ($|R_{T \to FI}|$) divided by the number of results ($|R_T|$).

For the mutually exclusive test ($T_{ME}$) which is associated with all failure modes of interest, selecting a result which is associated with only one failure mode of interest will increase the likelihood of that failure mode of interest and decrease the likelihood of all other failure modes of interest. When there is only one failure mode of interest, selecting the result associated with the failure mode of interest will increase the probability of all failure modes of interest.

For a mutually exclusive test ($T_{ME}$) which is associated with all failure modes of interest, selecting a result which is associated with more than one failure mode of interest will increase the likelihood of those failure modes of interest and decrease the likelihood of all other failure modes of interest.

For a mutually exclusive test ($T_{ME}$) which is associated with all failure modes of interest, selecting a result which is not associated with a failure mode of interest will decrease the likelihood of all failure modes of interest.

Thus, as shown in Equation (5-5) of FIG. 5B, the separation factor for a non-mutually exclusive test ($T_{ME}$), which is associated with all failure modes of interest but for which all failure modes of interest are not associated with the same test (T) result, is equal to the number of results associated with only one failure mode of interest ($|R_{T \to fi}|$) divided by the number of results ($|R_T|$).

As a whole, the formula for calculating the separation factor of a mutually exclusive test ($T_{ME}$) is given in Equation (5-6) of FIG. 5B.

Separation Factor of Non-Mutually Exclusive Tests

For a non-mutually exclusive test ($T_{NME}$), when a test (T) result is associated with only one failure mode of interest, selecting that result and only that result (or that result and other results which are not associated with a failure mode of interest) will increase the likelihood of just that one failure mode of interest.

For a non-mutually exclusive test ($T_{NME}$), when a test (T) result is associated with more than one failure mode of interest, selecting that result will increase the likelihood of more than one failure mode of interest.

For a non-mutually exclusive test ($T_{NMEs}$), when more than one result which is associated with a failure mode of interest is selected, the likelihood of more than one failure mode of interest will increase.

Thus, as shown in Equation (5-7) of FIG. 5C, the separation factor for a non-mutually exclusive test ($T_{NME}$), which is not associated with at least two failure modes, is equal to the number of results associated with only one failure mode of interest ($|R_{T \to FI}|$) divided by 2 to the power of the number of results associated with a failure mode of interest.

For the non-mutually exclusive test ($T_{NME}$) in which all but one failure mode of interest is associated with the test (T), selecting no results which are associated with a failure mode of interest will decrease the likelihood of all but one failure mode of interest. Thus, as shown in Equation (5-8) of FIG. 5C, for a non-mutually exclusive test ($T_{NME}$), which is associated with all but one failure mode of interest, the separation factor is equal to the sum of 1 plus the number of results associated with only one failure mode of interest ($|R_{T \to FI}|$) divided by 2 to the power of the number of results associated with a failure mode of interest ($2^{|RT \to FI|}$).

As shown in Equation (5-9) of FIG. 5C, the separation factor for a non-mutually exclusive test ($T_{NME}$), which is associated with all failure modes of interest but not failure modes of interest are associated with the same test (T) result, is equal to the number of results associated with only one failure mode of interest ($|R_{T \to FI}|$) divided by 2 to the power of the number of results associated with a failure mode of interest ($2^{|RT \to FI|}$).

As a whole, the formula for calculating the separation factor of a non-mutually exclusive test ($T_{NME}$) is shown in Equation (5-10) of FIG. 5C.

Figure 6:
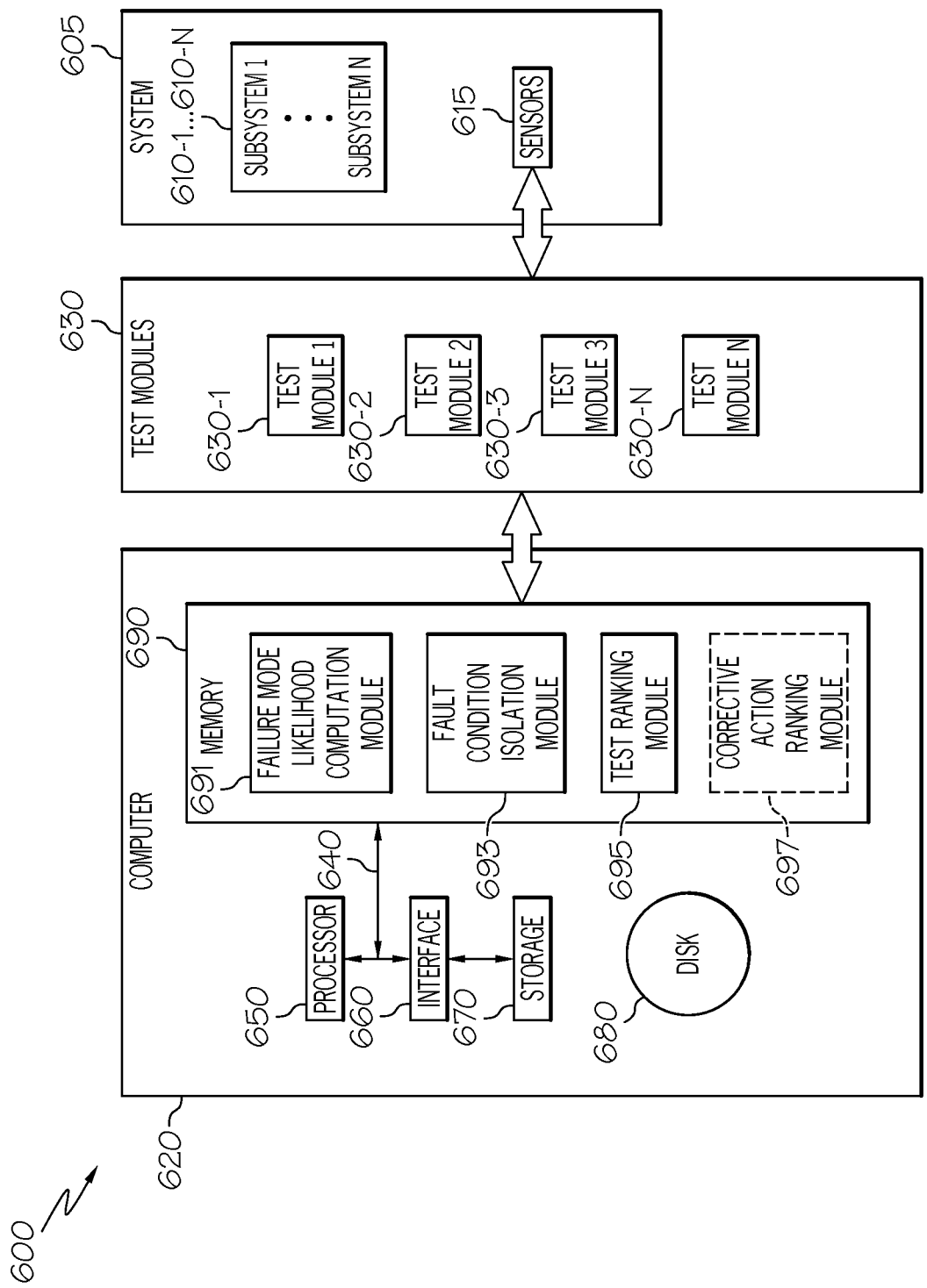
FIG. 6 is a functional block diagram of a system that is used in accordance with an exemplary embodiment to perform the methods described with references to FIGS. 1 and 2.

One exemplary non-limiting implementation of a system 600 in which the methods of FIGS. 1 and 2 can be implemented will now be described with reference to FIG. 6. FIG. 6 is a functional block diagram of a system 600 that is used in accordance with an exemplary embodiment. The system 600 can be used to perform the test ranking methods described above with references to FIGS. 1 and 2.

The system 600 includes a system under test 605, a computer 620, and one or more test modules 630 that are illustrated as being coupled between the system under test 605 and the computer 620, but which may also be implemented within the system under test 605 and/or the computer 620.

The system under test 605 includes a plurality of subsystems 610-1 . . . 610-N, each having one or more sensors 615. In one exemplary implementation, the system under test 605 can be a vehicle or a portion of a vehicle. For instance, in one embodiment, where the system under test 605 is an aircraft, the subsystems 610-1 . . . 610-N can include, for example, propulsion subsystems, fuel control subsystem, lubrication subsystems, environment control subsystems, landing subsystems, ground proximity monitoring subsystems, aircraft actuator subsystems, airframe subsystems, avionics subsystems, flight control subsystems, software subsystems, etc.

The one or more sensors 615 are preferably coupled to one or more components of the system 605 or the various subsystems 610 thereof. The sensors 615 can facilitate generation of data pertaining to operation of one or more subsystems of the system under test 605 to assist in performing diagnostic monitoring of one or more systems and/or subsystems. The sensors 615 can be coupled to test modules 630, and/or can also be coupled to the computer 620. Output data from the sensors 615 is provided to one or more of the test modules 630, and the test modules 630 can use data from the sensors 615 to generate test results. The test modules can identify adverse events caused by faults arising in one or more of the subsystems 610.

The computer 620 includes a computer bus 640, a processor 650, a computer interface 660, a storage device 670, a hard disk 680 and a memory 690.

The processor 650 performs the computation and control functions, and may comprise any type of processor 650 or multiple processors 650, single integrated circuits such as a microprocessor, or any suitable number of integrated circuit devices and/or circuit boards working in cooperation to accomplish the functions of a processing unit.

The memory 690 stores a failure mode likelihood computation module 691, a fault condition isolation module 693, a test ranking module (TRM) 695 and an optional corrective action ranking module 697. Each of the modules 691, 693, 695, 697 can include computer executable programs comprising executable code. For example, the test ranking module 695 can include computer executable programs to facilitate test ranking methods, such as those described above with reference to FIGS. 1 and 2. In one implementation, the memory 690 includes executable code for implementing test ranking methods that executes on processor 650. During operation, the processor 650 can execute the test ranking module 695 to rank various tests of interest. Some of the interactions of the test ranking module 695 with some of the other modules 691, 693, 697 will be described below with reference to FIG. 7.

The memory 690 can be any type of suitable memory. This can include the various types of dynamic random access memory (DRAM) such as SDRAM, the various types of static RAM (SRAM), and the various types of non-volatile memory (PROM, EPROM, and flash). It should be understood that the memory 690 may be a single type of memory component, or it may be composed of many different types of memory components. In addition, the memory 690 and the processor 650 may be distributed across several different computers that collectively comprise the computer system. For example, a portion of the memory 690 may reside on a computer within a particular apparatus or process, and another portion may reside on a remote computer.

The computer bus 640 serves to transmit programs, data, status and other information or signals between the various components of the computer 620. The computer bus 640 can be any suitable physical or logical means of connecting components of the computer 620. This includes, but is not limited to, direct hard-wired connections, fiber optics, and infrared and wireless bus technologies.

The computer interface 660 allows communication to the computer 620, for example from a system operator and/or another computer system, and can be implemented using any suitable method and apparatus. It can include one or more network interfaces to communicate to other systems or components, one or more terminal interfaces to communicate with technicians, and one or more storage interfaces to connect to storage apparatuses such as the storage device 670.

The storage device 670 can be any suitable type of storage apparatus, including direct access storage devices 670 such as hard disk drives, flash systems, floppy disk drives and optical disk drives. In one exemplary embodiment, the storage device 670 is a program product from which memory 690 can receive a test ranking program. The storage device 670 can comprise a disk drive device that uses disks 680 to store data.

It will be appreciated that while this exemplary embodiment is described in the context of a fully functioning computer 620, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links.

Figure 7:
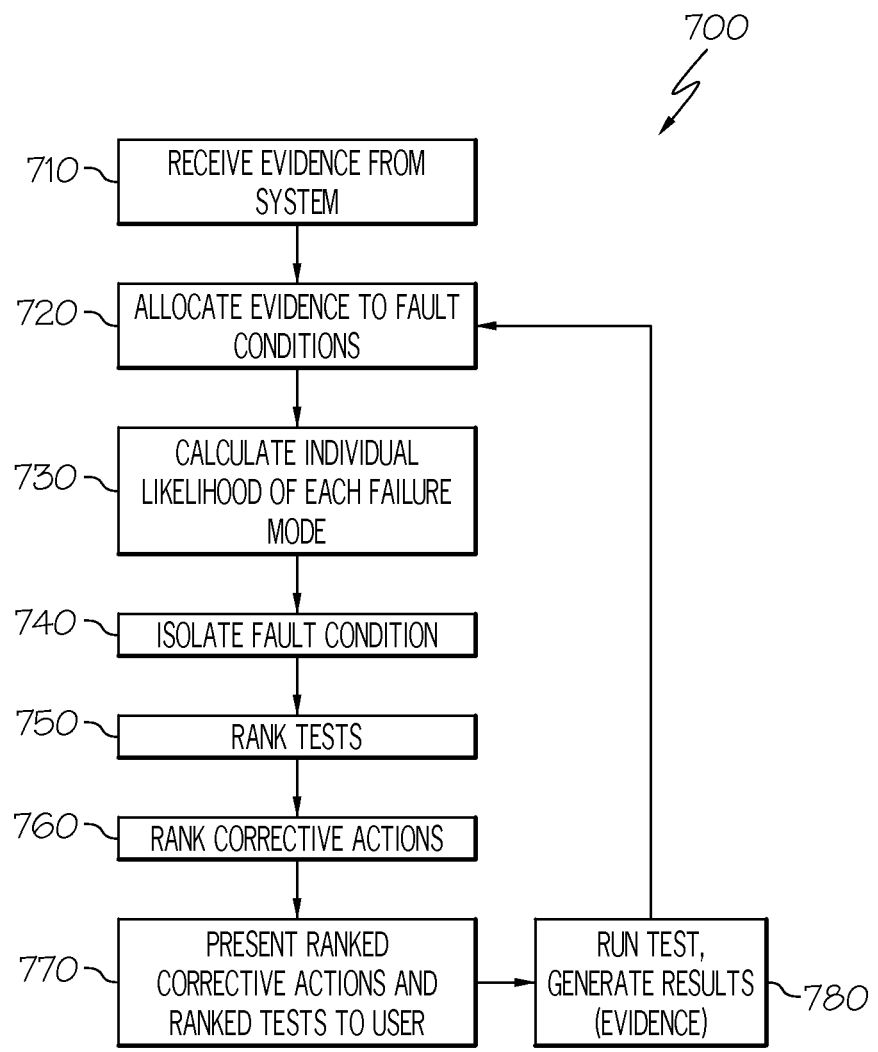
FIG. 7 illustrates a method in accordance with some of the other disclosed embodiments.

FIG. 7 illustrates a method 700 in accordance with some of the other disclosed embodiments. Method 700 will be explained with reference to various modules illustrated in FIG. 6.

At 710, evidence that may be indicative of one or more fault condition(s) is received from the system. This evidence can be direct evidence (e.g., evidence received directly from the sensors), built-in test (BIT) results from built-in tests, condition indicators (e.g., synthetic evidence received from algorithms that process direct evidence from either the sensors or BIT results), user input evidence, or corrective actions.

At 720, evidence from 710 can be allocated to one or more fault condition(s). In other words, the evidence received at 710 is evidence of the failure mode(s) in one or more fault condition(s). The particular allocation(s) of evidence to the fault condition(s) can be stored in memory, such as a fault condition database.

At 730, the failure mode likelihood computation module 691, calculates or computes an individual likelihood of each failure mode. Although not illustrated, the individual likelihood of each failure mode can be recorded to memory, such as a database.

At 740, the fault condition isolation module 693 isolates fault conditions. Here the term "isolates" refers to determining the failure mode which is causing symptoms (evidence) or the corrective actions which will fix the fault.

Although not illustrated in FIG. 6, the test ranking module 695 can receive inputs from the sensors (diagnostic evidence), information about the available test modules, and input from the test modules for tests that have been executed. At 750, the test ranking module 695 uses these inputs to rank the various tests using any of the methods described above. Although not illustrated, the various test rankings can be recorded to memory, such as a database.

At 760, the corrective action ranking module 697, which is optional and used in some embodiments, can rank corrective actions that correspond to the failure modes.

At 770, which is optional and performed in some embodiments, the ranked corrective actions and/or ranked tests can be presented to the user, for example, on a user interface 660, such as a display.

Based on the results from the test ranking module 695, at 780, one of the tests can be run to generate new results or evidence, and the method 700 loops back to 720, where step 720 repeats. In some implementations, the test that is selected to be run at 780 this highest ranked test that was determined at 750. In other implementations, the test that is selected to be run at 780 is selected based on the test ranking results that were determined at 750.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computerized method for ranking tests of interest, the method comprising:
    determining a set of failure modes of interest by a processor;
    determining a set of tests of interest;
    computing a differentiation factor for each of the tests of interest; and
    ranking each of the tests of interest based on respective differentiation factors.

2. The computerized method according to claim 1, wherein ranking comprises: ranking each of the tests of interest based on respective differentiation factors in a first order from a highest-valued differentiation factor to a lowest-valued differentiation factor.

3. The computerized method according to claim 1, wherein the differentiation factor has a value that is between zero and one.

4. The computerized method according to claim 3, wherein the differentiation factor is computed based on:
    a separation factor; and
    a ranking constant ($c_r$) that is a configurable value that is greater than or equal to 0 and less than or equal to 1.

5. The computerized method according to claim 4, wherein the differentiation factor is further computed based on:
    either an ambiguity factor or an uncertainty factor.

6. The computerized method according to claim 5, wherein the differentiation factor is equal to a sum of:
   the separation factor; and
   a product of the ranking constant ($c_r$) and the ambiguity factor.

7. The computerized method according to claim 6, wherein the ranking constant ($c_r$) is a configurable value used to scale weight of the ambiguity factor during computation of the differentiation factor.

8. The computerized method according to claim 5, wherein the differentiation factor is equal to a sum of:
   a product of the separation factor, and one minus the ranking constant ($c_r$); and
   a product of the ranking constant ($c_r$), and one minus an uncertainty factor.

9. The computerized method according to claim 8, wherein the ranking constant ($c_r$) is a configurable value used to scale weight of the uncertainty factor and weight of the separation factor during computation of the differentiation factor.

10. The computerized method according to claim 5, wherein the uncertainty factor, the separation factor, and the ambiguity factor are based upon a number of possible outcomes of a test of interest, and
   wherein a sum of the uncertainty factor, the separation factor, and the ambiguity factor is one.

11. The computerized method according to claim 1, further comprising:
   determining whether any of the differentiation factors are equal; and
   when at least one of the differentiation factors is equal to another one of the differentiation factors:
      computing a coverage factor for each of the tests of interest that have a differentiation factor equal to that of one or more other tests of interest; and
      re-ranking each of the tests of interest based on respective differentiation factors, and then based on respective coverage factors for any tests of interest that have a differentiation factor that is equal to that of another test of interest so that tests of interest having equal differentiation factors are ranked from a highest-valued coverage factor to a lowest-valued coverage factor.

12. The computerized method according to claim 11, wherein each of the tests of interest are ranked based on respective differentiation factors and then by respective coverage factors when any of the differentiation factors are equal, such that each of the tests having equal differentiation factors are ranked based on their respective coverage factors.

13. The computerized method according to claim 11, wherein the respective coverage factors computed for each of the tests of interest that have equal differentiation factors are used to distinguish between and specify a ranking order of the tests of interest that have the same differentiation factors.

14. The computerized method according to claim 11, wherein each of the respective coverage factors has a value that is between zero and infinity.

15. The computerized method according to claim 11, wherein each of the respective coverage factors is an average number of test results associated with a failure mode of interest that is equal to: a number of test results associated with a failure mode of interest ($|R_{T \to FI}|$) divided by a number of failure modes of interest ($|FI|$).

16. The computerized method according to claim 5, wherein the uncertainty factor has a value that is between zero and one that corresponds to a probability that a test will provide no information to differentiate between the likelihoods of the failure modes of interest; and
   wherein the uncertainty factor is a sum of: (a) a probability the test will not affect the likelihood of any failure modes of interest; (b) a probability the test will increase the likelihood of all failure modes of interest; and (c) a probability the test will decrease the likelihood of all failure modes of interest; and
   wherein the uncertainty factor is calculated by dividing a first sum by a total number of outcomes, wherein the first sum is a sum of (a) a number of outcomes of the test which will not affect the likelihood of a failure mode of interest, (b) a number of outcomes of the test which will increase all failure modes of interest, and (c) a number of outcomes that will decrease the likelihood of all failure modes of interest.

17. The computerized method according to claim 16, wherein the separation factor has a value that is between zero and one that corresponds to a probability that a test will separate out one and only one of the failure modes of interest from the other failure modes of interest; and
   wherein the separation factor is a sum of: (a) a probability that the test will increase the likelihood of only one particular failure mode of interest; and (b) a probability that the test will decrease the likelihood of all but one failure mode of interest and does not also increase the likelihood of the only one particular failure mode of interest; and
   wherein the separation factor is calculated by dividing a second sum by the total number of outcomes, wherein the second sum is a sum of (a) a number of outcomes of the test which will increase the likelihood of the only one particular failure mode of interest, and (b) a number of outcomes which will decrease the likelihood of all but one failure mode of interest but not increase the likelihood of one failure mode of interest.

18. The computerized method according to claim 17, wherein the ambiguity factor has a value that is between zero and one that corresponds to a probability that a test will provide some information to differentiate between the failure modes of interest, but not separate out a single failure mode of interest; and
   wherein the ambiguity factor is a sum of: (a) a probability that the test will increase the likelihood of more than one failure mode of interest, but not increase the likelihood of all failure modes of interest; and (b) a probability the test will decrease the likelihood of at least one failure mode of interest, but not decrease the likelihood of all but one failure mode of interest, and not decrease the likelihood of all failure modes of interest, and not increase the likelihood of any failure modes of interest; and
   wherein the ambiguity factor is calculated by dividing a number of outcomes which is not counted towards either the uncertainty factor or the ambiguity factor by the total number of outcomes.

19. The computerized method according to claim 1, wherein each test result in a set of test results of a test ($R_T$) is either associated with or not associated with a particular failure mode of interest, and wherein the set of test results includes a subset comprising one or more test results which are associated with the one or more failure modes of interest,
   wherein the set of failure modes of interest (FI) is a subset of all failure modes in a failure mode ambiguity group ($FM_{FC}$) of a fault condition, wherein the set of failure modes of interest (FI) comprises any failure mode (fm) in the failure mode ambiguity group ($FM_{FC}$) that is significant based on an isolation constant (c), wherein the isolation constant (c) is a configurable value used to decide if a fault condition can be isolated to a failure mode (fm) or group of corrective actions, and wherein the set of failure modes of interest (FI) include: a primary failure mode in the failure mode ambiguity group ($FM_{FC}$) that has a greatest individual likelihood ($fm_{max}$), and other failure modes in the failure mode ambiguity group that have an individual likelihood that is great enough to prevent the fault condition from isolating to a primary failure mode.

20. The computerized method according to claim 19, wherein determining a set of tests of interest, comprises:
   determining the set of tests of interest, based on the set of failure modes (FM), wherein the tests of interest include any test which has at least one result that is associated with at least one failure mode (fm) in the failure mode ambiguity group of the fault condition.

* * * * *